June 4, 1968  C. N. FLICK ET AL  3,386,317
BORE MACHINING MECHANISM
Filed May 31, 1966　　2 Sheets-Sheet 1
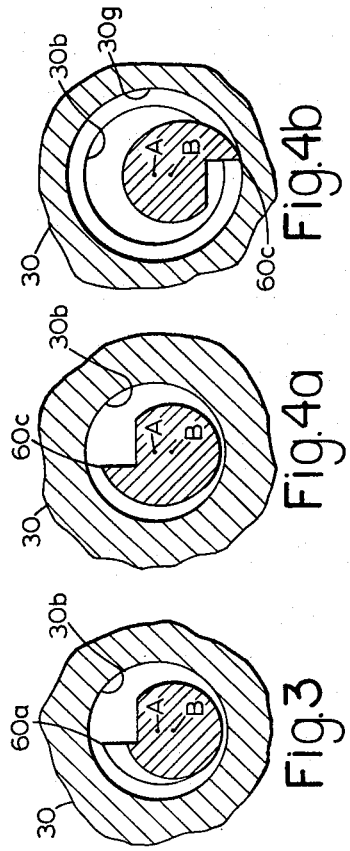
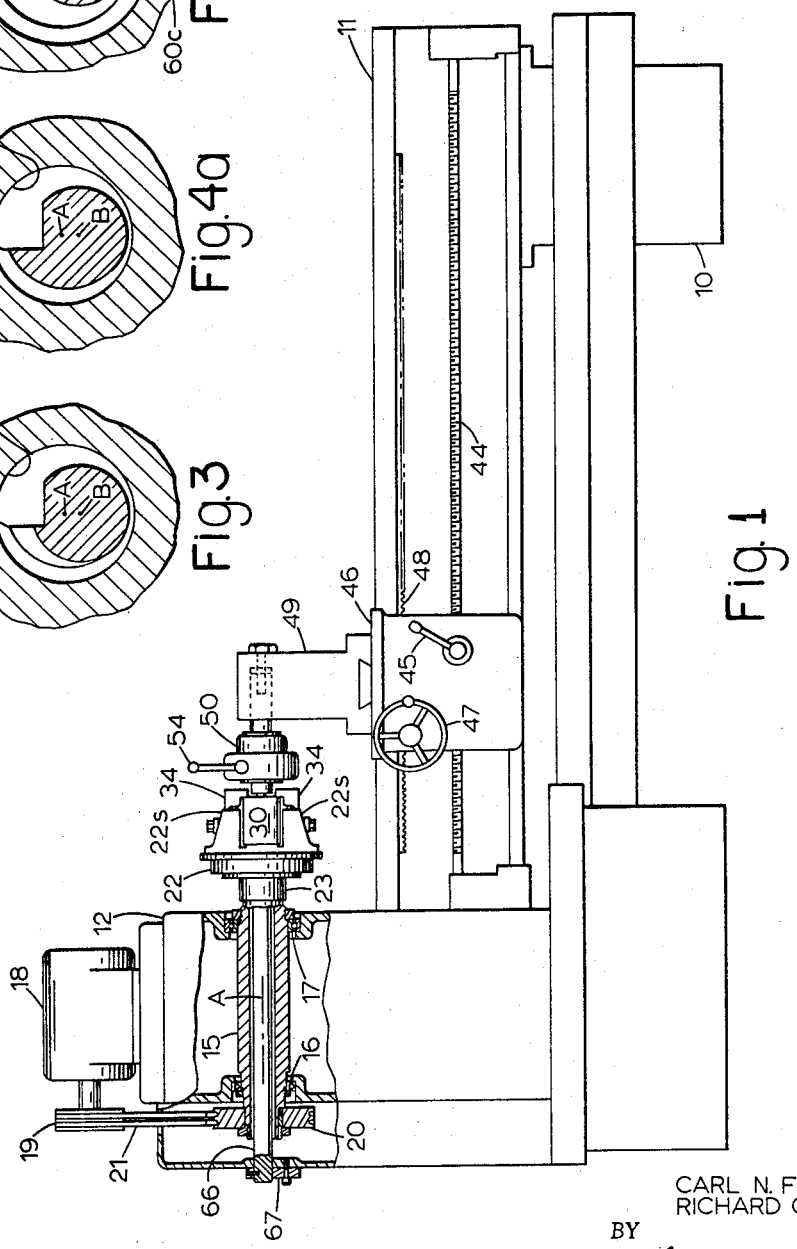
INVENTOR.
CARL N. FLICK
RICHARD C. GREATHOUSE
BY
ATTORNEYS

3,386,317
BORE MACHINING MECHANISM
Carl N. Flick and Richard C. Greathouse, Cincinnati, Ohio, assignors to The Cincinnati Milling Machine Co., Cincinnati, Ohio, a corporation of Ohio
Filed May 31, 1966, Ser. No. 554,012
5 Claims. (Cl. 77—3)

The present invention relates to mechanism for machining in a bore of a workpiece.

Machining in a bore of a workpiece is difficult because of the limited space available for the tool. Usually the tool lacks the rigidity necessary for accurate precision work because, in conventional mechanism, the tool is supported only at one end. Such a cantilevered tool is unsatisfactory for machining, for example, accurate grooves in a valve body.

In the present invention, an improved mechanism is provided for machining inside a bore. The mechanism has a rigidly supported tool which can produce accurate machining (such as the precision internal grooves in a hydraulic valve) quickly and effectively. In brief, in the preferred form of the invention, a rotatable chuck is provided which grips a workpiece having a bore. The chuck rotates the workpiece in the longitudinal central axis of the bore. An elongated tool with spaced cutting edges is mounted in a toolholder which is supported in a bearing. The bearing is movable towards and away from the chuck for moving the tool into and out of the workpiece. When the tool and workpiece are in operating position, the tool extends through the bore of the workpiece and into a bearing in the chuck. The two bearings, which straddle the workpiece, support the toolholder and tool for rotation on an axis spaced from the central longitudinal axis of the workpiece bore about which the workpiece rotates. When the tool, which has a cutting edge or edges extending therefrom, is rotated, the cutting edge or edges cut into the inner surface of the bore for machining thereof. Because the tool is supported on both sides of the workpiece, accurate machining, such as the production of grooves in a valve body, can be performed.

It is therefore one object of the present invention to provide improved mechanism for machining in a bore of a workpiece. It is another object of the present invention to provide a rigidly supported tool for accurate precision machining of the inner surface of a bore in a workpiece. It is yet another object of the present invention to provide mechanism with a rigidly supported tool for cutting internal grooves in a bore of a valve body. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a view in elevation of a lathe constructed in accordance with the present invention;

FIG. 3 is a view taken on the line 3—3 of FIG. 2; and

Figure 2:
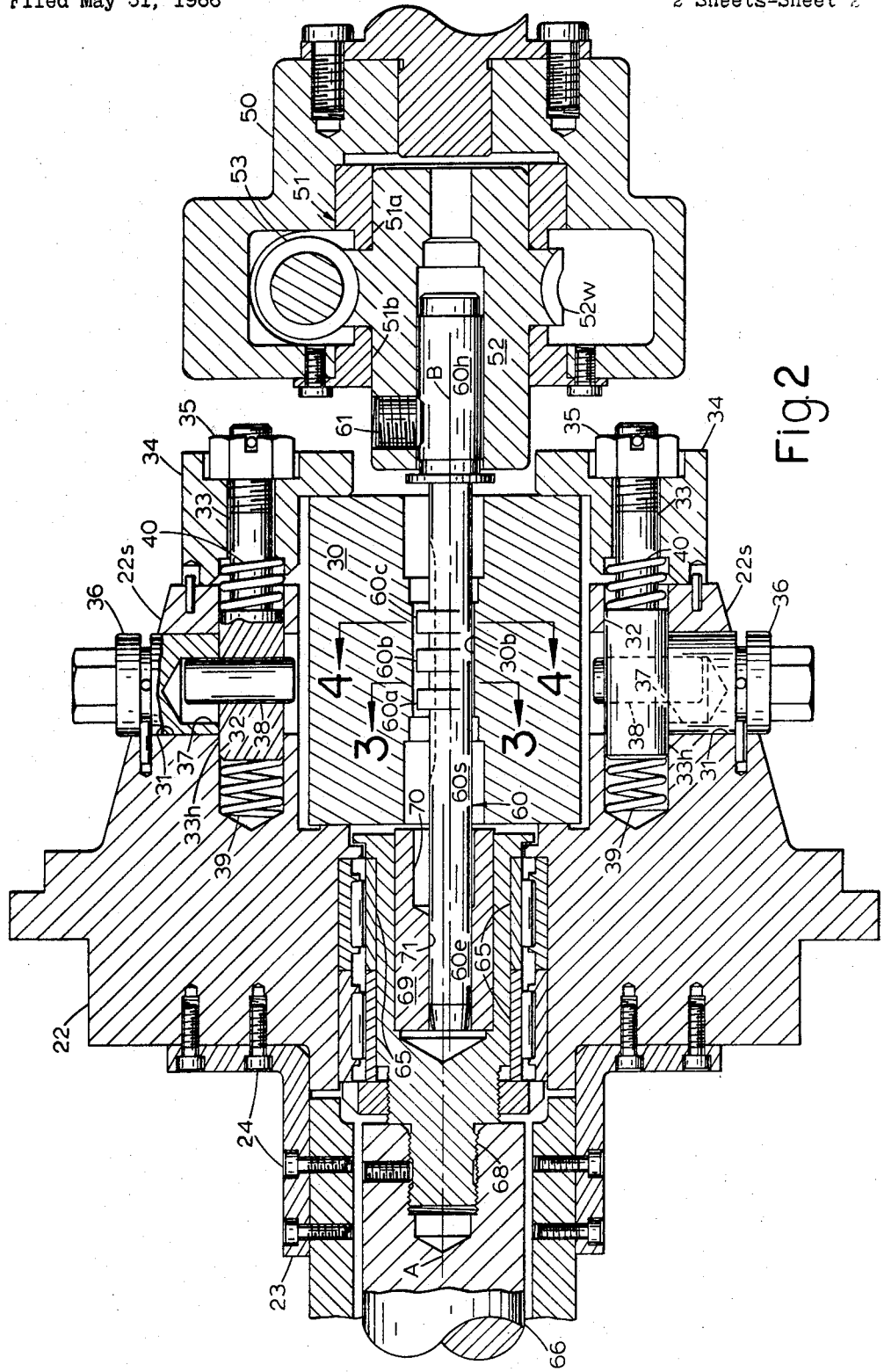
FIG. 2 is an enlarged view, in cross-section, of a portion of the mechanism of FIG. 1.

FIGS. 4a and 4b are views taken on the line 4—4 of FIG. 2, the tool in FIG. 4b being shown in a position 180 degrees from the position of the tool in FIG. 4a.

There is shown in FIG. 1 a lathe having a base 10, a bed 11, and a headstock 12. The headstock has a hollow spindle 15 mounted therein in antifriction bearings 16 and 17 for rotation in horizontal axis A. Spindle 15 is driven by motor 18 through pulley 19 connected to the output shaft of the motor, pulley 20 connected to spindle 15, and belts 21 received on pulleys 19 and 20. A chuck 22 is secured to spindle 15 by annular fitting 23, which is secured to the spindle and chuck by bolts 24 (see FIG. 2), for rotation of the chuck with the spindle in axis A.

The chuck 22, which is generally circular with two extending, spaced apart, sides 22S, receives a workpiece 30 between the sides. The sides 22S of the chuck, which straddle the workpiece, each has a radial bore 31 extending therethrough and each has an axial bore 32, as shown in FIG. 2. The axial bores 32 intersect, respectively, the radial bores 31. The cylindrical head 33h of a clamp bolt 33 is received in each axial bore 31. A jaw 34 is held on each bolt 33 by nut 35. A rotatable plug 36 in each radial bore 32 has an eccentric bore 37. A pin 38, secured in clamp bolt head 33h, extends into the bore 37 of plug 36. Rotation of plug 36, in one direction or the other, will shift jaw 34 in or out (by virtue of the eccentric bore 37 acting on pin 38) to clamp or release the workpiece 30. The springs 39 and 40 normally bias the jaws to the release position.

A slide 46 (FIG. 1) is mounted on the bed 11 of the lathe. Slide 46 is movable towards and away from chuck 22 by means of handwheel 47 which rotates a pinion (not shown) mounted in the slide and engaged with a rack 48 mounted on the bed 11. Although the slide can also be moved by the power operated lead screw 4, when a nut (not shown) in the slide is engaged therewith through operation of lever 45, only manual operation of the slide through handwheel 47 will be described for operating the mechanism of the invention. The slide 46 has an upstanding standard 49 to which a housing 50 is connected. The housing 50, as shown in FIG. 2, has secured therein a bearing 51, comprising two spaced apart portions 51a and 51b. Bearing 51 receives a toolholder 52 for rotation on the central longitudinal axis B of the bearing 51. The toolholder 52 has a worm wheel 52w thereon which is received between the two portions of bearing 51. Worm wheel 52w is engaged with a worm 53 which is journaled in housing 50. Worm 53 has a handle 54 connected thereto (see FIG. 1) for rotation of worm 53 and toolholder 52.

An elongated tool 60 (FIG. 2) has a head 60h and a shank 60s. The head 60h of the tool is received in the toolholder and secured therein by set screw 61. When the slide 46 is in the operating position (as shown in FIG. 1), and a workpiece 30 is secured in operating position in the chuck 22 (as shown in FIGS. 1 and 2), the shank 60s of the tool extends through a bore 30b in the workpiece in which machining is to be performed.

The chuck 22 has roller bearings 65 mounted therein on axis A. A stationary shaft 66 (FIG. 1) extends through spindle 15 and is connected to a headstock 12 by means of plate 67. The shaft 66 has a stationary extension 68 threadedly connected thereto which is received in bearings 65 in the chuck. The shaft extension 68 has a bearing 69 with two connecting bores 70, 71. The larger bore 70 lies on axis A and the smaller bore 71, which defines a bearing surface for the end 60e of the tool opposite the toolholder, lies on axis B. Thus, when the tool is in the operating position as shown in FIG. 2, both ends of the tool are firmly supported. The support given the toolholder by bearing 51 supports the head of the tool at one side of the workpiece and the bearing 69 supports the end of the tool opposite the toolholder on the other side of the workpiece.

The tool shank 60s has three spaced cutting edges 60a, 60b, and 60c extending therefrom. When the tool, which rotates in axis B, is in an angular position so the cutting edges extend in the direction that axis A is spaced from axis B (as shown in FIG. 3), the cutting edges will not engage the inner surface of the bore 30b in the workpiece. As the tool is rotated in axis B (clockwise as viewed in FIGS. 3, 4a, and 4b), the cutting edges swing into engagement with the inner surface of the bore and cut grooves 30g therein, because of the eccentricity between the axis of rotation of the tool and the bore. The grooves will be cut to precisely the correct depth since the tool is rigidly supported on both sides of the workpiece. The maximum depth of cut occurs when the teeth are in the direction away from the direction axis A is spaced from axis B (as shown in FIG. 4b). Continued rotation of the tool in the same (clockwise) direction will retract the tool from the bore surface.

In operating the mechanism of the present invention, the motor 18 is initially deenergized and the plugs 36 of the chuck are turned so that the eccentric bores therein are toward the jaws. The tool slide 46 is retracted by handwheel 47 so that the tool which is moved by the slide is clear of the chuck. A workpiece 30 is inserted between the sides 22s of the chuck and centered therein. The workpiece is centered by means of a cylindrical plug (not shown) which is inserted through the bore 30b of the workpiece and into bore 70 of bearing 69 in the chuck. The plugs 36 are then turned to clamp the workpiece in the chuck, and the centering plug is then removed. The slide 46 is advanced by operation of handwheel 47 to advance the tool through workpiece bore 30b until the end 60e of the tool is in bore 71 of bearing 69 in the chuck. After the tool and workpiece are in operating position, the motor 18 is energized to begin rotation of the chuck and the workpiece, which rotates in a counterclockwise direction as viewed in FIGS. 4a and 4b. After the workpiece is rotating, the handle 54 is turned to rotate the toolholder and tool for engaging the cutting edges of the tool with the inside of the workpiece bore. Continued rotation of the handle (in a clockwise direction) will feed the cutting edges into the inner surface of the bore to full depth and then out of engagement with the workpiece (by virtue of the eccentricity between the axis B of rotation of the tool and the axis A of rotation of the workpiece). After the machining operation is completed (that is, after one revolution of handle 54), the slide 46 is withdrawn, by handwheel 47, to retract the tool from the workpiece. The motor 18 is then deenergized and the workpiece removed from the chuck.

What is claimed is:

1. Mechanism for machining in a bore of a workpiece comprising:
    (a) means to mount the workpiece with the bore centered on a longitudinal axis,
    (b) an elongated tool having a cutting edge thereon,
    (c) means to mount the tool for extension through the bore, said means including a bearing at each end of the workpiece, said bearings positioned to support the tool for rotation in an axis displaced from the central longitudinal axis of the workpiece bore, and
    (d) means to rotate the tool and the workpiece.

2. Mechanism for machining in a bore of a workpiece comprising:
    (a) means to mount the workpiece with the bore centered on a longitudinal axis,
    (b) means to rotate the workpiece in said longitudinal axis,
    (c) a toolholder,
    (d) an elongated tool mounted in said toolholder, said tool having at least one cutting edge extending therefrom,
    (e) a bearing to support the toolholder on one side of the workpiece and a bearing to support the end of the tool opposite the toolholder on the other side of the workpiece, said bearings positioned to support the tool for rotation in a tool axis displaced from the longitudinal axis of the workpiece bore, and
    (f) means to rotate the toolholder in said tool axis to feed the cutting edge of the tool into the surface of said bore.

3. The mechanism of claim 2 in which at least one of said bearings is movable for replacement of the workpiece.

4. Mechanism for machining in a bore of a workpiece comprising:
    (a) a chuck rotatable in a longitudinal axis, said chuck adapted to grip the workpiece with the bore of the workpiece centered on said longitudinal axis to rotate the workpiece in an operating position,
    (b) a toolholder,
    (c) an elongated tool mounted in said toolholder, said tool having a plurality of spaced cutting edges,
    (d) a bearing spaced from the chuck to support the toolholder and a bearing in the chuck to support the end of the tool opposite the toolholder, said bearings straddling a workpiece in the operating position and positioned to support the tool for rotation in a tool axis displaced from the longitudinal axis of the chuck, and
    (e) means to rotate the toolholder in said tool axis to feed the cutting edges into the surface of said bore.

5. The mechanism of claim 4 in which the bearing to support the toolholder is movable away from the chuck for removal of the tool from the workpiece and for replacement of the workpiece.

References Cited

UNITED STATES PATENTS

| | | | |
|---|---|---|---|
| 1,496,169 | 6/1924 | Pyle | 77—3 |
| 2,284,336 | 5/1942 | Morrison | 77—3 |
| 2,643,554 | 6/1953 | Sperisen | 77—3 |
| 2,908,115 | 10/1959 | Ennis | 51—291 |
| 3,125,903 | 3/1964 | Briney et al. | 77—58 |
| 3,146,641 | 9/1964 | Benjamin et al. | 77—58 |

GERALD A. DOST, *Primary Examiner.*